Sept. 11, 1928.
W. D. KELLY
1,684,281
TEMPERATURE REGULATOR FOR ELECTRIC HEATERS
Filed March 21, 1925
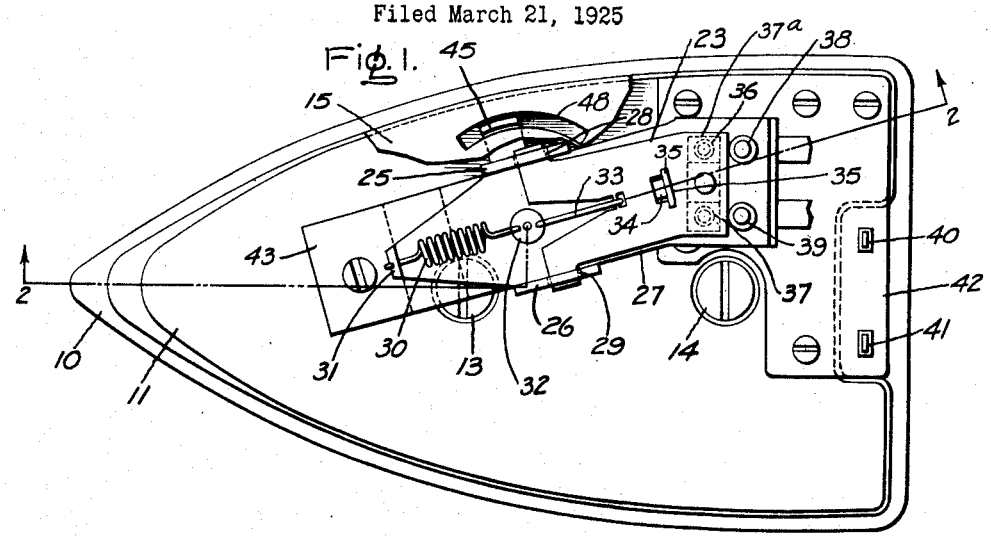
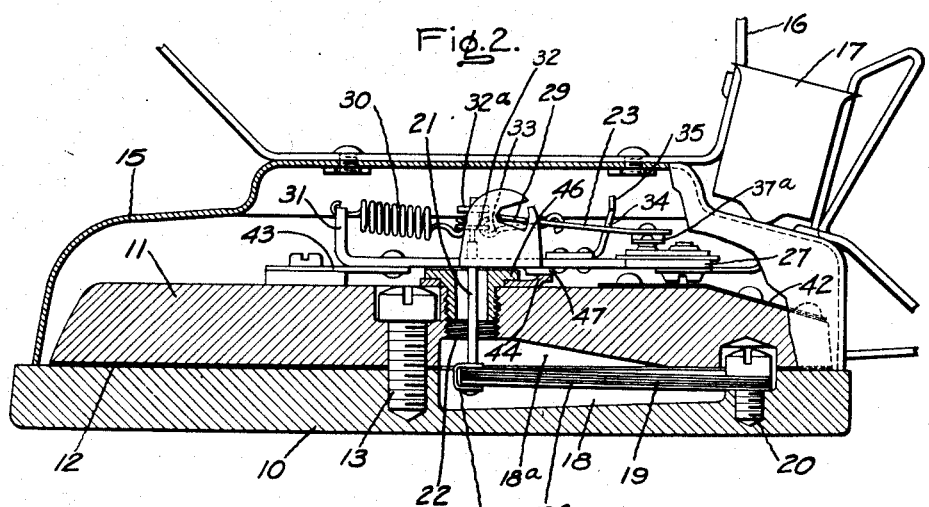
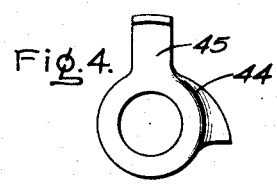
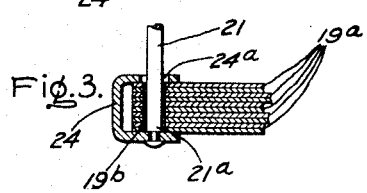
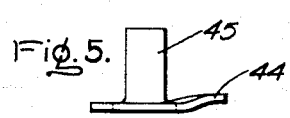
Inventor:
William D. Kelly,
by *Alexander T. Lunt*
His Attorney.

Patented Sept. 11, 1928.

1,684,281

UNITED STATES PATENT OFFICE.

WILLIAM D. KELLY, OF WESTERN SPRINGS, ILLINOIS, ASSIGNOR TO EDISON ELECTRIC APPLIANCE COMPANY, INCORPORATED, OF CHICAGO, ILLINOIS, A CORPORATION OF NEW YORK.

TEMPERATURE REGULATOR FOR ELECTRIC HEATERS.

Application filed March 21, 1925. Serial No. 17,395.

My invention relates to electric heaters and has for its object the provision of simple and reliable means for controlling the temperature of electric heaters.

My invention has particular application in automatically controlling the temperatures of electrically heated appliances, such as flatirons.

In carrying out my invention, I provide a quick make and break switch in the heating circuit which is opened and closed by means of a thermostat so as to maintain a predetermined temperature.

For a more complete understanding of my invention, reference should be had to the accompanying drawing in which Fig. 1 is a plan view with the cover removed of an electrically heated flatiron embodying my invention; Fig. 2 is a side elevational view mainly in section of the device shown in Fig. 1, the section being taken along line 2—2 of Fig. 1 looking in the direction of the arrows; while Figs. 3, 4 and 5 are detail views.

Referring to the drawing, I have shown my invention in one form as applied to a well known type of flatiron comprising a sole plate 10 and a pressure plate 11 between which is clamped a suitable flat resistance heating unit 12. The sole plate and pressure plate may be secured together by means of screws 13 and 14. A cover 15 fits over the pressure plate 11 and is secured against the sole plate 10 by means of screws (not shown). the sole plate being somewhat large than the pressure plate. A handle 16 is secured to the cover and also a plug guard 17 which is arranged to receive a suitable attachment plug cooperating with terminal pins (not shown) secured to the cover and projecting into the plug guard, whereby the heating unit may be connected to an electric source of supply in a well known manner.

In the upper surface of the sole plate 10 is an elongated recess 18 in which a thermostat 19 is secured. One end of the thermostat is secured rigidly to the sole plate by means of a screw 20 and the other end is free to move up and down in respose to changes in temperature. A recess 18$^a$ registering with recess 18 is provided in the lower surface of the pressure plate whereby the free end of the thermostat is given greater space for movement.

The thermostat 19 consists of a plurality of bimetallic thermostatic members or bars 19$^a$, five being shown, laid lengthwise one upon another and secured together in good thermal relation at one end only, preferably by brazing or welding. This welded end is secured to the sole plate 10 in good thermal relation therewith by the clamping screw 20. The bimetallic members are mechanically free from each other throughout the remainder of their lengths and can therefore expand and contract independently of each other. The welded connection at the end clamped under the screw 20 provides for uniform conduction of heat to all the bimetallic members thereby promoting uniformity of action. It will be understood that due to the relative expansion and contraction of the two metals forming each of the members 19$^a$, the members will be distorted and take curved shapes upon an increase in temperature. This causes lateral upward and downward movement of their free ends, the members being assembled in such manner that their free ends move upward and downward in unison. In the arrangement shown the members are also so assembled that the thermostat will bend upward upon an increase in temperature. By providing a plurality of separate bimetallic thermostatic members, the force which the thermostat is capable of exerting is correspondingly multiplied, while at the same time the range of movement is not affected. If the thickness of the metals forming a single bimetallic thermostatic bar were increased in order to increase the operating force, the deflection of the thermostat would be decreased.

Connected to the free end of the thermostat 19 is an operating link 21 which extends upward through an aperture 22 in the pressure plate and has its upper end operatively connected to a pivoted switch arm 23. The connection between the link 21 and the thermostat is loose to allow the various members of bars 19$^a$ of the thermostat to slide slightly with relation to each other upon movement of the free end of the thermostat. As shown in Fig. 3, a yoke 24 is placed over the end of the thermostat, and the link 21 is secured to this yoke and passed through relatively large holes 19^b in the ends of the thermostatic members. Preferably the link 21 is rotatably secured to the yoke 24, as by providing a shoulder 21^a near the lower end of the link 21 and upsetting the lower end of the link to secure the lower end of the yoke between this shoulder and the upset end. The upper end of the yoke is provided with a relatively large hole 24^a for the link 21.

The switch arm 23 is supported in brackets 25 and 26 which are secured to, and may, in fact, be integral with a supporting member 27. As shown, knife edge bearings 28 and 29 are provided on the switch arm, which bearings are inserted in suitable apertures in the brackets 25 and 26. The switch arm is snapped quickly from open to closed position by means of a spring 30, one end of which is pivotally secured to the upturned end 31 of the supporting member 27 while its other end is pivotally secured to an intermediate link member 32 which is in turn secured to the switch arm by a link 33. The pivot of the switch arm in brackets 25 and 26 is between the point of connection of the link 33 with the switch arm and the point of connection of spring 30 with the supporting member 27. The upper end of link 21 is threaded and screwed into a tapped central hole in the link 32 whereby the links 21 and 32 are secured together. A locknut 32^a is provided to secure the link 32 in any adjusted position on the link 21.

Upon an increase in temperature, the link 32 will be moved upward by the distortion of the thermostat. Upon the occurrence of a predetermined maximum temperature the point of connection between the spring 30 and the link 33 formed by the link 32 will be moved above a position of alinement with the points of connection of the other ends of the spring and link member whereupon the switch arm will be snapped quickly upward by the spring 30 from the closed position shown in the drawing to open position. The device now cools down and upon the occurrence of a predetermined minimum temperature, the link 32 will be moved downward by the thermostat to such position that the switch arm will be snapped quickly back to closed position as shown in the drawing. The flatiron is thus maintained at a predetermined mean temperature.

A stop is provided for limiting the movement of the switch arm to open position. This stop consists of a bracket 34 secured to the support 27 and extending through an aperture in the switch arm. On the upper end of the bracket 34 is a lateral extension 35 against which the switch arm comes to rest in open position.

Carried by the switch arm are electrically connected bridging contacts 36 and 37 which cooperate with insulated stationary contacts secured to the support 27 and electrically connected with binding posts 38 and 39. The bridging contacts are secured to the ends of a resilient conducting member 37^a which is loosely secured centrally to the switch arm in electrically insulated relation therewith so that the contacts 36 and 37 can adjust themselves to the stationary contacts. By means of the binding posts, the switch may be connected in circuit with the heating unit 12 in a well known manner. It will be understood that these current carrying parts are electrically insulated from their supports. A central portion of the pressure plate is cut away at the rearward end to provide space for bringing out the terminals 40 and 41 of the heating unit. A sheet 42 of suitable insulating material, such as mica, is placed on the pressure plate, and the terminals 40 and 41 are brought out through spaced apertures in this sheet whereby they are secured in insulated relation with each other.

The supporting member 27 is mounted at its left hand end on a spring strip 43 which is secured to the pressure plate. By means of a cam 44, the right hand end of the support 27 can be raised or lowered to change the temperature setting. This cam 44, as shown in Figs. 4 and 5, forms a part of an arm 45 which is pivotally mounted on a threaded sleeve 46 screwed into the aperture 22, the aperture being tapped to receive the sleeve 46. The sleeve 46 is provided with a head so that the arm 45 is secured in place thereby on the pressure plate. The cam 44 is formed by striking upward an extension on one side of the arm 45 so as to form an inclined upper surface, against which bears a projection 47 on the support 27. The end of arm 45 is bent upward and projects through a slot 48 in the cover 15. By adjusting the arm 45 about its pivot, the right hand end of support 27 can thus be raised and lowered to change the temperature setting. When the right hand end of support 27 is lowered the thermostat moves the switch arm to open circuit position at a lower maximum temperature whereby the device is maintained at a lower mean temperature, and conversely when the support 27 is raised a higher mean temperature is maintained. The sheet of insulating material 42 extends underneath the free end of member 27 to prevent engagement of the binding posts 38 and 39 with the pressure plate 11. The link 32 will be initially adjusted on link 21 by turning link 21, and locked by the locknut 32^a, so that temperature adjustments within a certain restricted range can be made thereafter by means of the arm 45.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claim.

What I claim as new and desire to secure by Letters Patent of the United States, is,—

A temperature regulator for electric heaters comprising a movably mounted support, a switch arm pivotally mounted on said support, a helical spring having one end connected to said support, a link connecting the other end of said spring with said switch arm, a thermostat, and a connection between said thermostat and the junction between said spring and said link whereby said switch arm is snapped from one position to another by said thermostat to maintain a predetermined temperature, and means for adjusting said support to change the temperature setting.

In witness whereof, I have hereunto set my hand this 17th day of March, 1925.

WILLIAM D. KELLY.